(12) United States Patent
Kamisuwa et al.

(10) Patent No.: US 9,402,010 B2
(45) Date of Patent: Jul. 26, 2016

(54) ELECTRONIC APPARATUS CAPABLE OF SETTING VALUE ADJUSTMENT AND SETTING VALUE ADJUSTMENT METHOD OF ELECTRONIC APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Yoshikatsu Kamisuwa, Tokyo-to (JP); Masaki Narahashi, Tokyo-to (JP); Sou Miyazaki, Tokyo-to (JP); Reiji Murakami, Kanagawa-ken (JP)

(73) Assignees: TOSHIBA TEC KABUSHIKI KAISHA, Tokyo (JP); KABUSHIKI KAISHA TOSHIBA, Tokyo (JP)

( * ) Notice: Subject to any disclaimer, the term of this patent is extended or adjusted under 35 U.S.C. 154(b) by 62 days.

(21) Appl. No.: 13/752,481

(22) Filed: Jan. 29, 2013

(65) Prior Publication Data
US 2013/0201507 A1 Aug. 8, 2013

Related U.S. Application Data

(60) Provisional application No. 61/593,941, filed on Feb. 2, 2012.

(51) Int. Cl.
*G03G 15/00* (2006.01)
*G06F 3/00* (2006.01)
*H04N 1/00* (2006.01)

(52) U.S. Cl.
CPC .......... *H04N 1/0097* (2013.01); *H04N 1/00344* (2013.01); *H04N 1/00408* (2013.01); *H04N 2201/0094* (2013.01)

(58) Field of Classification Search
CPC .......... H04N 1/00411; H04N 1/00474; H04N 1/00965
USPC ................................. 358/1.14, 1.13
See application file for complete search history.

(56) References Cited

U.S. PATENT DOCUMENTS

| | | | |
|---|---|---|---|
| 2003/0200035 A1* | 10/2003 | Niki | G03G 21/0005 702/33 |
| 2007/0280717 A1* | 12/2007 | Kamisuwa | G03G 15/502 399/81 |
| 2009/0037716 A1 | 2/2009 | Okamoto et al. | |
| 2009/0158178 A1* | 6/2009 | Birsan | 715/762 |
| 2013/0070299 A1 | 3/2013 | Narahashi et al. | |
| 2013/0073908 A1 | 3/2013 | Miyazaki et al. | |

* cited by examiner

*Primary Examiner* — Akwasi M Sarpong
(74) *Attorney, Agent, or Firm* — Amin, Turocy & Watson LLP

(57) ABSTRACT

An electronic apparatus comprises a storage apparatus configured to store a model-specific setting value information containing a name of machine, a setting item code that is the object for adjusting of the setting value and an outlier determination condition of the setting value, which is predefined every combination the model name and the setting item, and a self-apparatus setting value information containing a setting value of self-apparatus, the setting item code and the setting value, and a control panel configured to display a display unit for displaying the model-specific setting value information and the self-apparatus setting value information every setting item code, and an adjustment value input screen including a input unit for inputting a new setting value.

6 Claims, 5 Drawing Sheets

FIG.3

| MODEL NAME | SETTING ITEM CODE | SAMPLING NUMBER | AVERAGE | MODE | STANDARD DEVIATION | THRESHOLD VALUE |
|---|---|---|---|---|---|---|
| TypeA | 1150 | 10000 | 300.5 | 290 | 15.0 | 150,350 |
| TypeA | 1152 | 10000 | 143.3 | 150 | 20.1 | 120,160 |
| ... | ... | ... | ... | ... | ... | ... |
| TypeA | 2160 | 10000 | | | OFF | OFF |
| ... | ... | ... | ... | ... | ... | ... |

FIG.4

ADJUSTMENT MODE                               SETTING ITEM CODE: 1234

SETTING VALUE          600

AVERAGE                                602.3
MODE                                   600
STANDARD DEVIATION                     10.2
THRESHOLD VALUE (LOWER LIMIT)          571.7
THRESHOLD VALUE (UPPER LIMIT)          632.9

[7] [8] [9]
[4] [5] [6]
[1] [2] [3]

CONFIRM    CANCEL

ELECTRONIC APPARATUS CAPABLE OF SETTING VALUE ADJUSTMENT AND SETTING VALUE ADJUSTMENT METHOD OF ELECTRONIC APPARATUS

CROSS-REFERENCE TO RELATED APPLICATIONS

This application is based upon and claims the benefit of priority from U.S. Provisional Application No. 61/593,941 filed on Feb. 2, 2012; the entire contents of which are incorporated herein by reference.

FIELD

The embodiments descried herein relate to an electronic apparatus capable of setting value adjustment and a setting value adjustment method for the electric apparatus.

BACKGROUND

Conventionally, when changing the condition of the apparatus due to the difference in use environment (region) or changing the setting value in recovery operations, a serviceman confirms a corresponding setting item code by reference to a manual, inputs the setting item code and adjusts a setting value, or inputs a setting item code stored as an empirical value to change a setting value.

Through digitization, colorization, diversification, colorized or multi-functionalized, the number of the setting item code as an adjustment object of the setting value in the image forming apparatus is on the increase, the number of the code are increased from hundreds reach thousands. Thus, it is extremely difficult for the serviceman to remember all the code numbers. Consequentially, in adjusting a setting value, the serviceman needs to refer to a manual to confirm a code number for an adjustment.

However, there are so many setting item codes which are all different in value range that sometimes a value beyond a normal action range is set.

BRIEF DESCRIPTION OF THE DRAWINGS

FIG. 3 is a diagram showing an example of the model-specific setting value information acquired by an MFP from a management server.

FIG. 4 is a diagram showing an example of an adjustment value input screen of an MFP.

DETAILED DESCRIPTION

In accordance with an embodiment, an electronic apparatus comprises a storage apparatus configured to store a model-specific setting value information containing a name of machine, a setting item code that is the object for adjusting of the setting value and an outlier determination condition of the setting value, which is predefined every combination the model name and the setting item, and a self-apparatus setting value information containing a setting value of self-apparatus, the setting item code and the setting value, and a control panel configured to display a display unit for displaying the model-specific setting value information and the self-apparatus setting value information every setting item code, and an adjustment value input screen including a input unit for inputting a new setting value.

An MFP (Multi Functional Peripheral) serving as an image forming apparatus is described below as an embodiment of the electronic apparatus. The MFP is a digital complex machine which can scan, read and copy an original image according to a given resolution and sheet size as well as make flexible use of a FAX-based image receiving function, an Email-based image receiving function, a network-based printed image receiving function and the functions of various other office equipments.

Figure 1:
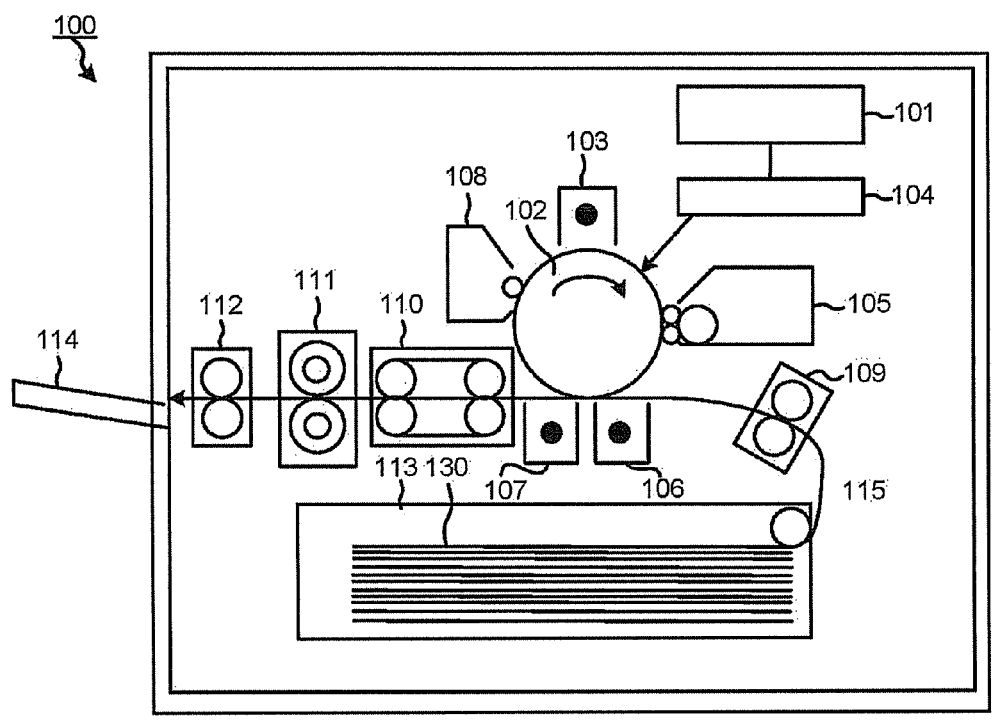
FIG. 1 is a schematic diagram illustrating an example of a structure related to the copy function of an MFP.

FIG. 1 is a schematic diagram illustrating an example of a structure related to the copy function of an MFP 100. As shown in FIG. 1, the MFP 100 comprises: a control unit 101, a photosensitive drum 102, a charger 103, a scanning and exposing unit 104, a developer 105, a transfer charger 106, a peeling charger 107, a cleaner 108, a paper feed unit 109, a paper carrying unit 110, a fixer 111, a paper discharge unit 112 and a paper discharge tray 114.

The control unit 101 is a processor such as a CPU for controlling the actions of each unit of the MFP 100. The photosensitive drum 102 rotates in a vertical scanning direction (the peripheral direction of the photosensitive drum 102). The charger 103 is arranged nearby the periphery of the photosensitive drum 102 to charge the surface of the photosensitive drum 102 uniformly.

The scanning and exposing unit 104 gives off light/stops according to an image signal while scanning a semiconductor laser. After passing through a polarizer such as a polygon mirror, the laser light emitted from the semiconductor laser becomes light scanning in a horizontal scanning direction (the direction of the rotation shaft of the photosensitive drum 102). Further, the laser light is irradiated onto the photosensitive drum 102 by an optical system such as a lens. If the laser light is irradiated to the surface of the charged photosensitive drum 102, then the potential of the irradiated part is reduced to form an electrostatic latent image. The developer 105 applies a developing agent on the electrostatic latent image formed on the photosensitive drum 102 to form a toner image on the photosensitive drum 102.

Further, a paper tray 113 is arranged at the bottom of the MPF 100. A paper feed roller 115 isolates the paper 130, piece by piece, in the paper tray 113 and conveys the isolated paper to the paper feed unit 109. The paper feed unit 109 feeds the paper 130 to the transfer position of the photosensitive drum 102. The transfer charger 106 transfers the toner image onto the fed paper 130.

The peeling charger 107 peels the paper 130 from the photosensitive drum 102. The paper 130 on which the toner image is transferred is conveyed by the paper conveying unit 110. The fixer 111 fixes the toner image on the paper 130. The paper discharge unit 112 discharges the paper 130 on which the image is printed to the paper discharge tray 114. In addition, the cleaner 108 is propped against the photosensitive drum 102 to remove the residual toner on the photosensitive drum 102 after the toner image is transferred onto the paper 130. Moreover, the photosensitive drum 102 returns to its initial state, that is, a standby state for the forming of the next image.

An image forming action is carried out continuously by repeating the actions involved in the process above. When the quality of an output image is abnormal or is required by the user to be adjusted, the serviceman changes each setting value of the MFP 100 to adjust the quality. For example, in the case where a splash (a stain caused in a non-print area by toner) occurs in an image that cannot be improved through an automatic adjustment, the setting grid bias of the charger 103 is manually fine-adjusted to obtain a high-quality image.

Figure 2:
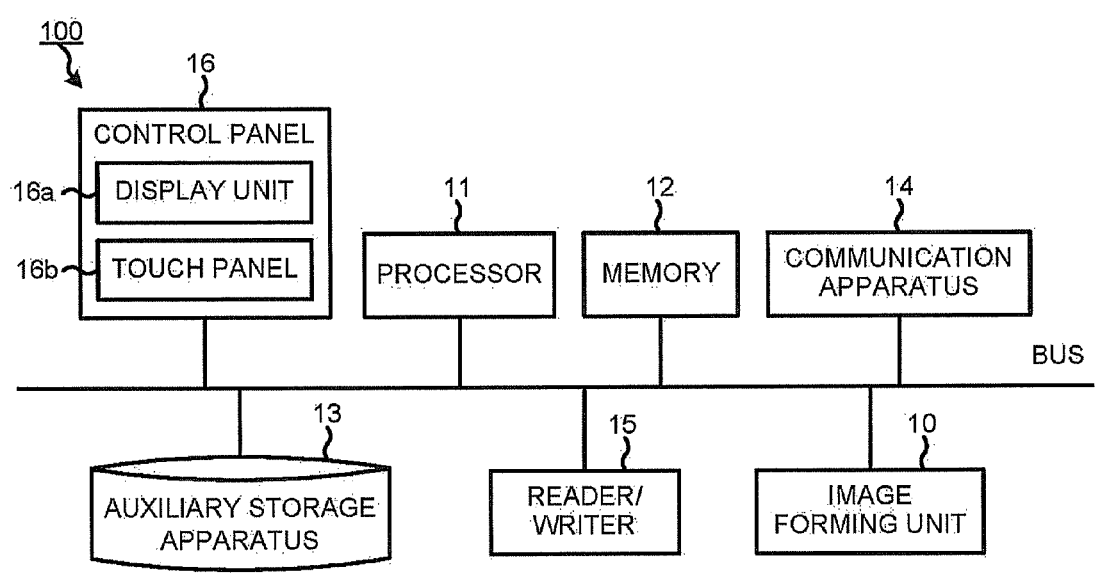
FIG. 2 is a diagram showing an example of the hardware structure of an MFP.

FIG. 2 is a diagram showing an example of the hardware structure of the MFP 100. As shown in FIG. 2, in addition to an image forming unit 10, the MFP 100 further comprises a processor 11, a memory 12, an auxiliary storage apparatus 13, a communication apparatus 14, a reader-writer 15 and a control panel 16. The processor 11 is a CPU (Central Processing Unit) for comprehensively controlling the actions of the MFP 100. The memory 12 is a read-only ROM (Read Only Memory) for storing a basic program or environment file for activating a computer or an RAM (Random Access Memory) for storing the programs executed by the processor 11 and the data needed for the execution of a program. The auxiliary storage apparatus 13 is a storage apparatus such as an HDD (Hard Disk Drive) in which the data relative to the use condition of the MFP 100, the setting value information (machine data) in the electronic apparatus, the model-specific setting value information acquired from a management server 200 and the programs executed by the FMP 100 are stored. The communication apparatus 14 transfers information with the MFP 100 via the Internet N. The reader-writer 15 is a apparatus which reads, in an offline manner, a recording medium such as a USB (Universal Serial Bus) memory or an SD memory card in which the model-specific setting value information is stored, and synchronously writes the self-apparatus setting value information determined by an adjustment value input screen into the recording medium. The control panel 16 is a display unit 16a for displaying the model-specific setting value information and the self-apparatus setting value information according to each setting item code and an input/output apparatus for displaying an adjustment value input screen of a touch panel 16b provided with an input unit for inputting a new setting vale.

FIG. 3 is a diagram showing an example of the model-specific setting value information acquired by the MFP 100 from the management server 200. In FIG. 3, the model-specific setting value information consists of model names, setting codes, sampling numbers, averages, modes, standard deviations and threshold values serving as an outlier determination condition for setting values. The sampling number refers to the number of the machines used for calculating the statistical data above.

FIG. 4 is a diagram showing an example of the adjustment value input screen of the MFP 100. In FIG. 4, an average, a mode, a standard deviation and threshold values are displayed on the adjustment value input screen with reference to the model-specific setting value information stored in the auxiliary storage apparatus 13. Further, the default values of the setting values are set according to existing self-apparatus setting value information.

Figure 5:
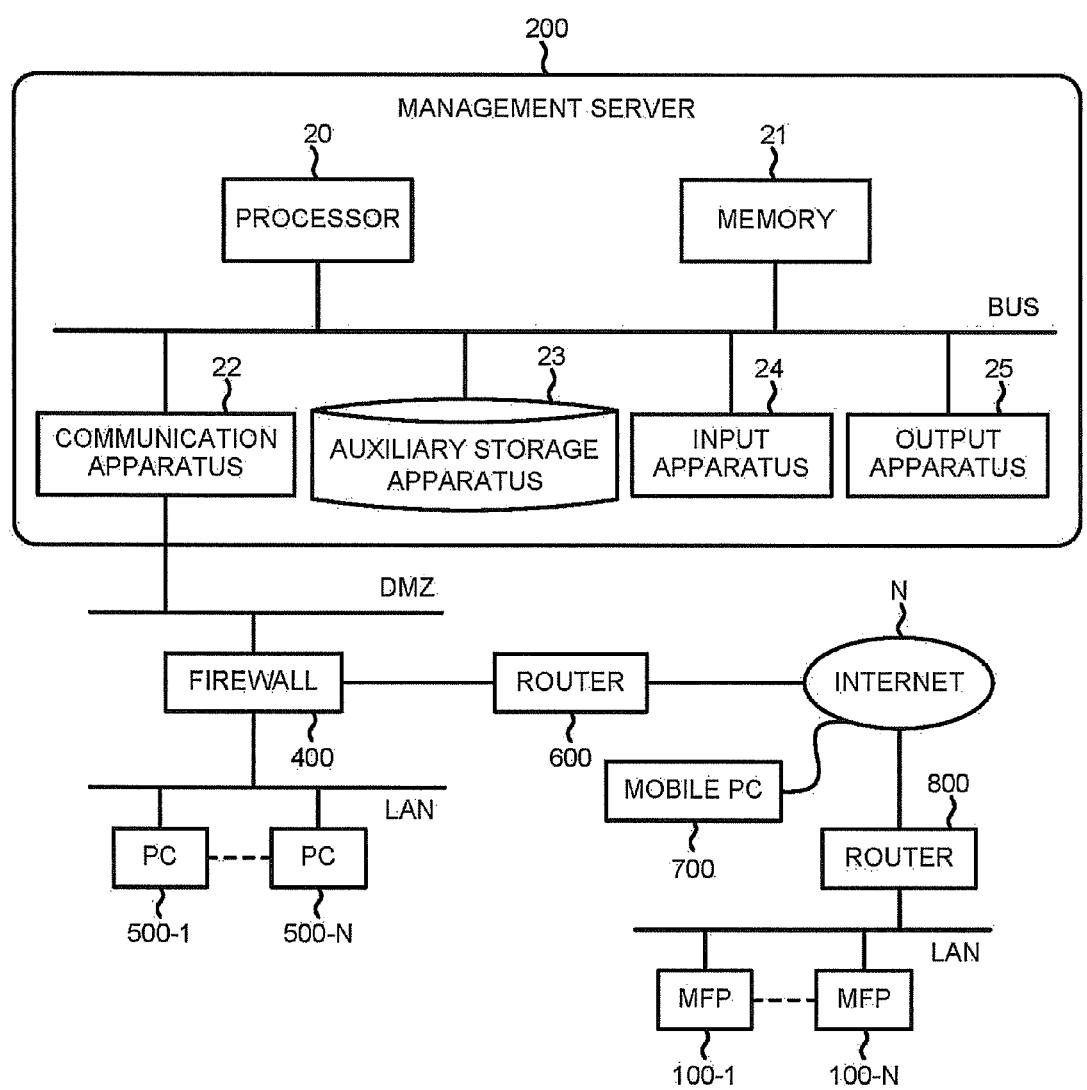
FIG. 5 is a diagram showing a structural example of a computer system for collecting and managing setting value data of an MFP.

FIG. 5 is a diagram showing a structural example of a computer system for collecting and managing the setting value data of an MFP. As shown in FIG. 5, a router 600 and a firewall 400 are arranged in a service center to reject an external unauthorized access. A management server 200 is connected with a DMZ (Demilitarized zone) behind the firewall 400 to permit a special access exclusively.

The management server 200 is provided with a processor 20, a memory 21, a communication apparatus 22, an auxiliary storage apparatus 23, an input apparatus 24 and an output apparatus 25. The processor 20 is a CPU for controlling the actions of each machine of the management server 200. The memory 21 is an ROM or RAM. The communication apparatus 22 transfers information with the MFP 100 via the Internet N. The data relative to the use conditions of a plurality of MFPs 100 or the program executed by the management server 200 is stored in the auxiliary storage apparatus 23. For example, an outlier calculation program 231 is stored in the auxiliary storage apparatus 23. In addition, a database 232 is set in the auxiliary storage apparatus 23 to store the model-specific setting value information which is obtained by statistically analyzing the setting values collected by a plurality of MFPs 100 in the market according to each combination of a model name and a setting item code.

The input apparatus 24 refers to a keyboard, a mouse, a USB interface or another input unit for the user to input a command or data to the management server 200. The output apparatus 25 is a display apparatus for prompting information.

Figure 6:
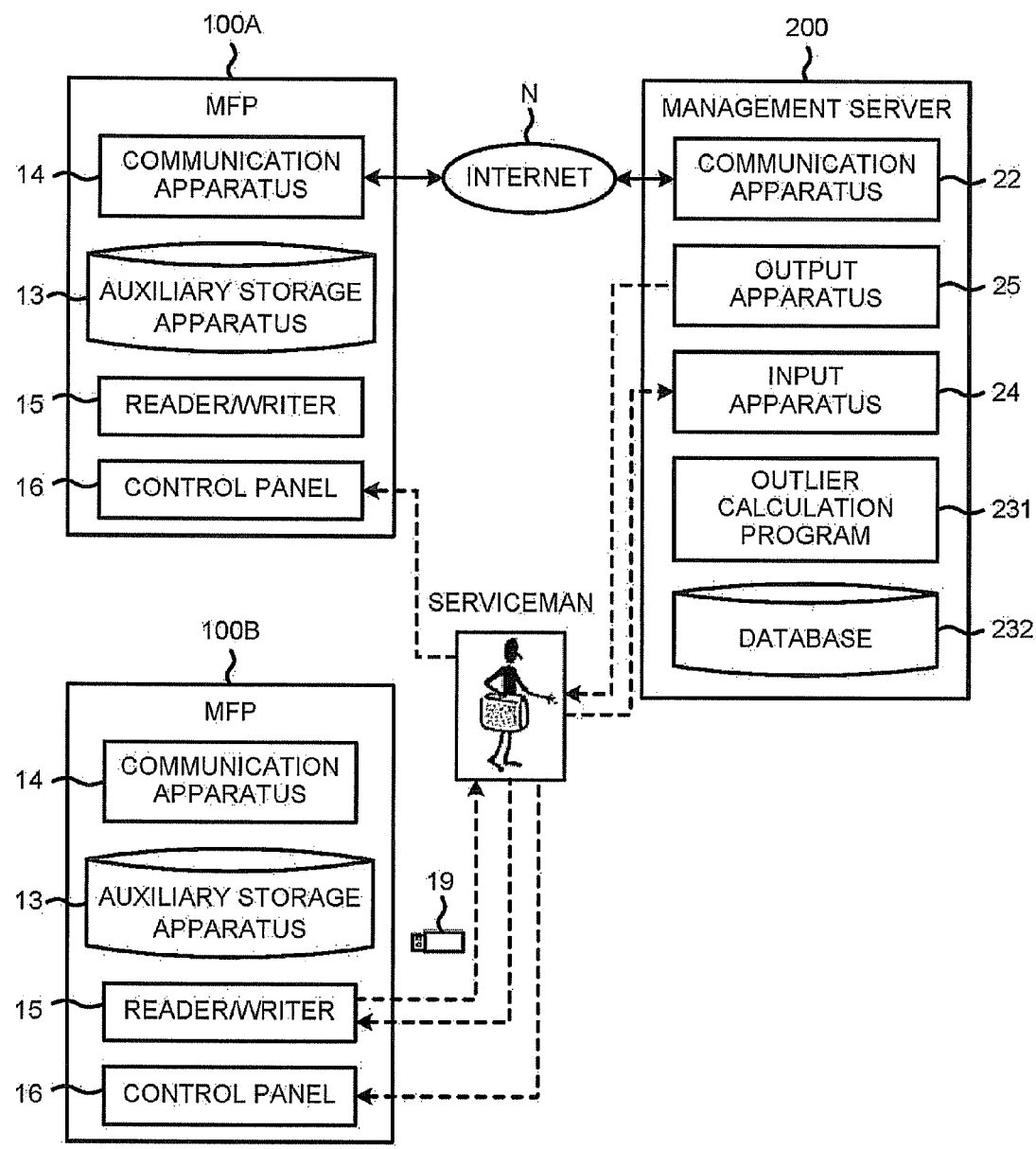
FIG. 6 is a diagram illustrating a path for the input/output of machine data for the calculation of an outlier.

FIG. 6 is a diagram illustrating a path for the input/output of machine data for the calculation of an outlier. As shown in FIG. 6, the MFP 100 comprises a communication apparatus 14 which is classified, for the external management server 200, into a group of first MFPs 100A for sending the data relative to the state of the machine in an online manner and a second group of offline MFP 100B set not communicating with the management server 200 in an online manner. The data relative to the state of a machine exemplarily contains various setting values such as the grid bias of the charger 103 and the development bias of the developer 105.

For the second MFP 100B, a removable medium such as a USB memory 19 is used, and setting value information is input to the management server 200 by the input apparatus 24 (reader-writer).

Next, the calculation of a setting outlier is described below. First, a method for setting the average of setting values is described in order to determine a setting outlier. The management server 200 collects the data on the machines in the market which is collected by the first MFP 100A via a network and the machine data which is collected by the serviceman of the second MFP 100B in an offline manner and calculates the statistical data (model-specific setting value information) shown in FIG. 3 by executing an outlier calculation program 231. As the MFP 100A and the MFP 100B are updated in daily maintenance, the statistical data is periodically updated as well. The statistical data is basically totalized from an average, a standard deviation and a sampling number according to the type and the setting codes of each machine.

When the setting values are not successive values, for example, when attribute is nominal scale, as no average is calculated, a mode is calculated in advance. In addition, in order to determine an outlier, threshold values (upper limit, lower limit) predetermined for each setting are calculated. The threshold values define the set range assumed during the design of the MFP 100 or refer to the values determined empirically. The average may be an intermediate value, instead of an average, depending upon the property of a setting item.

Next, specific examples of the outlier determination method are described aiming at threshold value setting methods. Here, if one assumes that the setting value follows normal distribution then treats the setting value as an outlier in the situation that the difference between the setting value and an average is greater than three times of a standard deviation. Assuming a setting value is x, an average is $\mu$ and a standard deviation is σ, then a setting value meeting the following conditional expression (1) becomes an outlier:

$$|x-\mu|/\sigma 3 \quad (1)$$

Typically, the method is used to detect an outlier, and it is assumed that the method is used in most cases. At this time, the upper limit and the lower limit of a threshold value are set to be (μ+3σ) and (μ−3σ), respectively. Further, the difference between the setting value and the average may be 2 times or 1.5 times, but not 3 times, as great as the standard deviation. In this case, the setting values read as outliers are more than those read in the case where the difference is 3 times as great as the standard deviation. On the contrary, when the difference is set to be 4 times as great as the standard deviation, the setting values read as outliers are less than those read in the case where the difference is 3 times as great as the standard deviation. A suggested setting range determined in the design phase is contained in each setting item, and a range beyond the suggested setting range can be taken as outliers.

In addition, if the lower limit and the upper limit of the threshold value are set to be $\theta_l$ and $\theta_h$, then a setting value meeting the following conditional expression (2) becomes an outlier:

$$x<\theta_l, \theta_h<x \quad (2)$$

Although two outlier calculation methods are exemplarily described above, an outlier is not limited to be calculated by those methods but can also be calculated by a method of statistically calculating the threshold values of an outlier, such as Smirnov Test.

In addition, in the embodiment, if communication is periodically carried out at a given moment (e.g. 10:00 every day), then the first MFP 100A communicate with the management server 200. The first MFP 100A send the data relative to the current action, such as the serial number of the electronic apparatus, the current date and time and setting values, to the management server 200 during the communication. The management server 200 stores the information received from the MFP 100A in the auxiliary storage apparatus 23. Then, the MFP 100A confirm additional information such as the status of the communication and the statistical data list of setting values, store the confirmed additional information in the database 231 of the auxiliary storage apparatus 23, and end the communication with the management server 200.

On the other hand, when the serviceman accesses the second MFP 100B, as setting value information is stored in the removable medium such as a USB memory, the database 232 of the auxiliary storage apparatus 23 is updated in the management server 200 by reading the setting value information stored in the USB memory from the input apparatus 24. That is, like the first MFP 100A, a detachable recording medium such as the USB memory 19 can also collect machine data for the management server 200 in an offline manner, taking into consideration of the great many offline MFPs 100 in the market. Moreover, even connected with a communication line such as the Internet N, for the sake of security, many machines provide no machine information.

Figure 7:
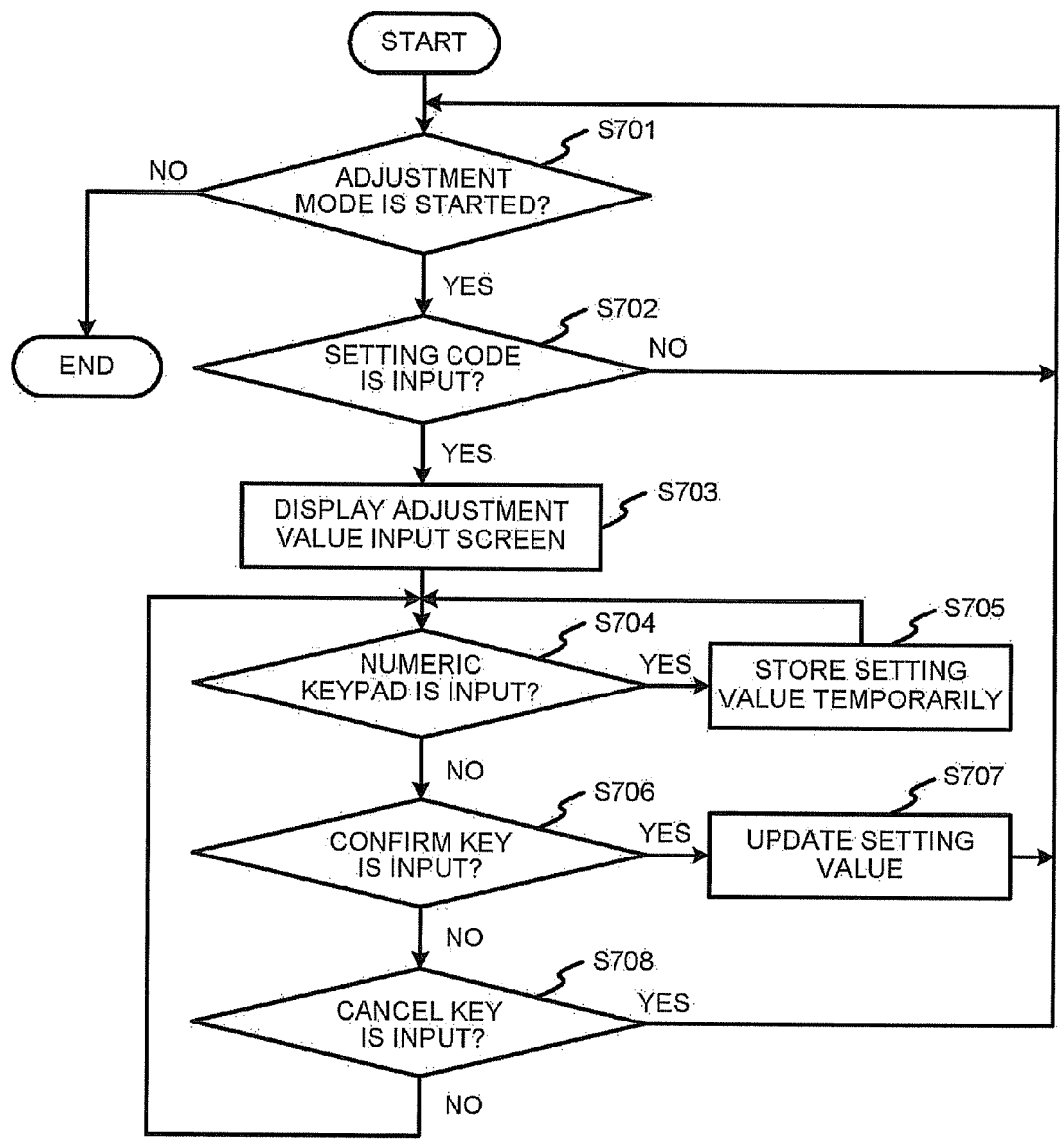
FIG. 7 is a flowchart showing an example of the adjustment value input processing of an MFP.

A method for adjusting setting values of the MFP 100 with the structure above is described below with reference to FIG. 7. Here, the change on the grid bias of the charger is exemplarily described.

In ACT S701, the processor 11 determines whether or not an adjustment mode is started in the MFP 100. ACT S702 is executed if it is determined that the adjustment mode is started (S701: Yes). Comparatively, the processing is ended if it is determined that the adjustment mode is not started or ended (S701: No).

In ACT S702, the processor 11 determines whether or not a setting item code is input on the control panel 16. ACT S703 is executed if it is determined that a setting item code is input (S702: Yes). Comparatively, the flow returns to ACT S701 if it is determined that no setting item code is input (S702: No).

In ACT S703, the processor 11 displays an adjustment value input screen relative to the input setting item code on the control panel 16. For example, when the grid bias (assuming setting item code to be "1234") of the charge is changed, if the input code number is "1234", then the processor 11 acquires model-specific setting value information indicating the storage of setting item codes in the auxiliary storage apparatus 13 as keys and self-apparatus setting value information, and displays the acquired information on an adjustment value input screen for the grid bias, as shown in FIG. 4.

In ACT S704, the processor 11 determines whether or not a numeric keypad is pressed on the adjustment value input screen. Here, if it is determined that the numeric keypad is pressed (S704: Yes), setting values are stored in the memory 12 temporarily (S705), and then the flow returns to ACT S704. Comparatively, ACT S706 is executed if it is determined that the numeric keypad is not pressed (S704: No).

In ACT S706, the processor 11 determines whether or not a confirm key is pressed on the adjustment value input screen. Here, when it is determined that the confirm key is pressed (S706: Yes), the setting value of the grid bias stored in the auxiliary storage apparatus 13 is updated according to the input value displayed on the screen, and the flow returns to ACT S701. Comparatively, ACT S708 is executed if it is determined that the confirm key is not pressed (S706: No).

In ACT S708, the processor 11 determines whether or not a cancel key is pressed on the adjustment value input screen. The flow returns to ACT S701 if it is determined that the cancel key is pressed (S708: Yes). For example, when the serviceman inputs an error code or when it is determined that no change on a value is desired, the cancel key, but not the confirm key, is pressed to end the processing without changing any setting value. Comparatively, the flow returns to ACT S704 if it is determined that the confirm key is not pressed (S708: No).

ACTs S701-S708 are repeatedly executed until an adjustment on setting values is ended. Moreover, if a desired adjustment is ended, the adjustment mode is terminated to return to the normal copy mode.

In accordance with the embodiment, by displaying statistical data such as threshold values on the control panel 16 of the MFP 100, the electronic apparatus enables the serviceman to confirm whether or not there is an error in the value to be input. In addition, even if the serviceman inputs an undesired code, the error can be readily found as the input value is significantly different from the threshold value. Thus, after being correctly and effectively adjusted, the electronic apparatus is protected against a fault or error operation.

In addition, in the embodiments above, the MFP 100 is described as an example of the electronic apparatus capable of being adjusted in setting value, however, the electronic apparatus applied herein is not limited to this, any electronic apparatus to which a serviceman can apply an adjustment is applicable, for example, a POS (Point Of Sale system) apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising: a storage apparatus configured to store a model-specific setting value information containing a model name of machine,
   a setting item code that is the object for adjusting of the setting value, and an upper limit and a lower limit of a threshold value as an outlier determination condition of the setting value,
   which is predefined every combination the model name and the setting item,
   and a self-apparatus setting value information containing a setting value of self-apparatus,
   the setting item code and the setting value; and a control panel configured to display an adjustment value input screen including a display unit for displaying the upper limit and the lower limit of at least the threshold value of the setting value which is included in the model-specific setting value information and the self-apparatus setting value information every setting item code,
   the displayed threshold value of the setting value enabling a user to confirm whether or not there is an error in an input setting and enabling detection of the error when the input setting value is significantly different from the threshold value,
   the displayed value enabling the user to adjust the input value which protects the electronic apparatus against any fault or error operation,
   and an input unit for inputting a new setting value, and wherein the upper limit and the lower limit of the threshold value are respectively calculated by statistically analyzing the setting values of a plurality of machines every combination the model names and the setting item code according to a given rule.

2. The electronic apparatus according to claim 1, wherein the electronic apparatus is an image forming apparatus.

3. The electronic apparatus according to claim 2, wherein when the setting value relative to the self apparatus is set to be x, the average of the setting values relative to the plurality of machines is set to be $\mu$, and the standard deviation is set to be $\sigma$, the outlier determination condition is $|x-\mu|/\sigma > 3$.

4. The electronic apparatus according to claim 2, wherein the setting item code refers to the code of the grid bias of a charger.

5. A setting value adjustment method, comprising: acquiring a model-specific setting value information containing a model name of machine,
   a setting item code that is the object for adjusting of the setting value,
   and an upper limit and a lower limit of a threshold value an outlier determination condition of the setting value,
   which is predefined every combination the model name and the setting item, and a self-apparatus setting value information containing a setting value of self-apparatus the setting item code and the setting value;
   outputting an adjustment value input screen for displaying at least the upper limit and the lower limit of the threshold value of the setting value which is included in the model-specific setting value information and the self-apparatus setting value information every setting item code;
   the displayed threshold value of the setting value enabling a user to confirm whether or not there is an error in an input setting and enabling detection of the error when the input setting value is significantly different from the threshold value,
   the displayed value enabling the user to adjust the input value which protects the electronic apparatus against any fault or error operation,
   and inputting a new setting value on the adjustment value input screen; and wherein the upper limit and the lower limit of the threshold value are respectively calculated by statistically analyzing the setting values of a plurality of machines every combination the model names and the setting item code according to a given rule.

6. The setting value adjustment method according to claim 5, wherein
   the outlier determination condition refers to a value which is calculated by statistically analyzing the setting values of a plurality of machines every combination the model names and the setting item code according to a given rule.

* * * * *